United States Patent
Nagamune

(10) Patent No.: US 6,892,132 B2
(45) Date of Patent: May 10, 2005

(54) COMMUNICATION NAVIGATION SYSTEM, COMMUNICATION NAVIGATION METHOD, MAP DATA TRANSMITTING DEVICE, AND TERMINAL UNIT

(75) Inventor: Akira Nagamune, Tokyo-to (JP)

(73) Assignees: Pioneer Corporation, Tokyo-to (JP); Increment P Corporation, Tokyo-to (JP)

(*) Notice: Subject to any disclaimer, the term of this patent is extended or adjusted under 35 U.S.C. 154(b) by 31 days.

(21) Appl. No.: 10/208,016

(22) Filed: Jul. 31, 2002

(65) Prior Publication Data

US 2003/0028317 A1 Feb. 6, 2003

(30) Foreign Application Priority Data

Jul. 31, 2001 (JP) .................................. P2001-232552

(51) Int. Cl.⁷ .......................... G01C 21/30; G08G 1/123
(52) U.S. Cl. .................. 701/208; 701/211; 340/995.12; 340/995.14; 340/995.15; 342/357.09; 342/357.13; 455/456.2; 455/457; 707/10
(58) Field of Search ................................ 701/208, 207, 701/209, 210, 211, 23–26, 200–202; 340/988, 989, 990, 995.1, 981, 993, 995.17, 995.18, 995.19, 995.11, 995.12, 995.14, 995.15; 342/357.01, 357.02, 357.06, 357.07, 357.08, 357.09, 357.1, 357.13, 357.17; 455/456.1, 456.2, 456.3, 456.5, 456.6, 457; 707/1, 102, 104.1; 709/223, 232, 238, 240

(56) References Cited

U.S. PATENT DOCUMENTS

| | | | | |
|---|---|---|---|---|
| 5,187,810 A | | 2/1993 | Yoneyama et al. ......... 455/509 |
| 5,801,680 A | * | 9/1998 | Minakuchi .................. 345/589 |
| 5,999,126 A | * | 12/1999 | Ito .......................... 342/357.1 |
| 6,052,645 A | * | 4/2000 | Harada ....................... 701/212 |
| 6,075,467 A | * | 6/2000 | Ninagawa .............. 340/995.14 |
| 6,097,316 A | * | 8/2000 | Liaw et al. ................. 340/988 |
| 6,278,939 B1 | | 8/2001 | Robare et al. .............. 701/208 |
| 6,278,941 B1 | | 8/2001 | Yokoyama .................. 701/209 |
| 6,282,492 B1 | | 8/2001 | Gorai et al. ................ 701/209 |
| 6,320,518 B2 | * | 11/2001 | Saeki et al. ............ 340/995.12 |
| 6,324,467 B1 | * | 11/2001 | Machii et al. .............. 701/200 |
| 6,336,073 B1 | | 1/2002 | Ihara et al. ................. 701/202 |
| 6,385,458 B1 | * | 5/2002 | Papadimitriou et al. . 455/456.2 |
| 6,542,816 B1 | | 4/2003 | Ito et al. ..................... 701/209 |
| 6,587,787 B1 | * | 7/2003 | Yokota ....................... 701/212 |
| 2001/0007090 A1 | * | 7/2001 | Irie et al. .................... 701/211 |
| 2002/0010772 A1 | * | 1/2002 | Kusano ...................... 709/223 |
| 2002/0029224 A1 | * | 3/2002 | Carlsson ................. 707/104.1 |
| 2002/0065606 A1 | | 5/2002 | Kawai et al. ............... 701/211 |
| 2003/0028313 A1 | | 2/2003 | Nagamune .................. 701/202 |
| 2003/0028314 A1 | | 2/2003 | Nagamune .................. 701/202 |
| 2003/0074130 A1 | * | 4/2003 | Negishi et al. ............. 701/200 |
| 2003/0083851 A1 | | 5/2003 | Nagamune .................. 702/189 |

FOREIGN PATENT DOCUMENTS

| | | |
|---|---|---|
| EP | 0 696 774 A2 | 2/1996 |
| EP | 0 738 876 A2 | 10/1996 |
| EP | 0 766 216 A1 | 4/1997 |
| JP | 09-330025 | 12/1997 |

* cited by examiner

*Primary Examiner*—Jacques H. Louis-Jacques
(74) *Attorney, Agent, or Firm*—Nixon & Vanderhye, PC

(57) ABSTRACT

A communication navigation system that performs navigation, using map data stored in a map database site and current position data about navigation terminals, by transmitting the map data to the navigation terminals via a communication network such as the Internet, wherein the map data includes data units respectively corresponding to a plurality of display elements for display on a map, and the data units are given respective priority levels. The map database site is provided with a server for transmitting the data units via the communication network according to the respective priority levels. Each navigation terminal is provided with a transmitter/receiver for sequentially receiving the data units transmitted from the server, and a display subsystem for sequentially displaying the display elements respectively corresponding to the data units received by the transmitter/receiver, on the map.

21 Claims, 9 Drawing Sheets

FIG. 6

<MAP ON INTERMEDIATE SCALE>

| PRIORITY LEVEL | DISPLAY ELEMENT |
|---|---|
| 1 | SEAS/OCEANS/RIVERS |
| 2 | HIGHWAYS/NATIONAL ROADS |
| 3 | BULLET TRAIN LINES (SHINKANSEN) |
| 4 | PRINCIPAL/LOCAL ROADS |
| 5 | PARKS/GREEN ZONES |
| 6 | FACTORIES/FACILITIES |
| 7 | ADMINISTRATIVE BOUNDARIES |
| 8 | ALLEYS |
| 9 | NOTES |

<CITY MAP>

| PRIORITY LEVEL | DISPLAY ELEMENT |
|---|---|
| 1 | SEAS/OCEANS/RIVERS |
| 2 | ROADS |
| 3 | BLOCKS |
| 4 | ADMINISTRATIVE BOUNDARIES |
| 5 | LARGE BUILDINGS |
| 6 | HOUSES |
| 7 | NOTES |

COMMUNICATION NAVIGATION SYSTEM, COMMUNICATION NAVIGATION METHOD, MAP DATA TRANSMITTING DEVICE, AND TERMINAL UNIT

BACKGROUND OF THE INVENTION

1. Field of the Invention

The present invention relates to communication navigation systems and methods, etc. for performing navigation by transmitting map data to navigation terminals via a communication network. More particularly, the invention is directed to a communication navigation system and method, etc. capable of appropriately displaying maps on the navigation terminals.

2. Description of Related Art

Various types of communication navigation systems have been proposed, which perform navigation by transmitting map data stored in a map database site, via computer and mobile communications networks including the Internet, to various types of navigation terminals, such as in-vehicle navigation units, portable navigation units, PDAs (Personal Digital Assistants) and cellular telephones, according to their request. Each of these navigation terminals presents a user with predetermined information visibly and audibly, based on position data detected by a GPS (Global Positioning System) receiver mounted thereon as well as the map data transmitted from the map database site, to guide the user to his or her destination.

In some cases, these communication navigation systems may transmit the map data at low speeds, depending upon traffic on the computer networks and how the systems are being used, for example. To display different map areas on the screen of a navigation terminal by scrolling in particular, the navigation terminal needs to receive a plurality of items of map data corresponding to these areas for quick display. To implement a satisfactory scroll-based display when the map data is transmitted at low speeds, the scroll speed must be reduced, or it may alternatively be arranged so that an area is not displayed at all unless the navigation terminal receives map data for that area within a predetermined time limit, under a fixed scroll speed. In the latter case, the user cannot, for example, check the current position, destination, etc. on the map, to his or her disadvantage.

SUMMARY OF THE INVENTION

An object of the invention is to provide a communication navigation system and method, etc. capable of appropriately displaying maps even if map data is not transmitted at sufficiently high speeds.

A first aspect of the invention provides a communication navigation system that performs navigation, using map data stored in a map database site and current position data about navigation terminals (T), by transmitting the map data to the navigation terminals (T) via a communication network (IN), wherein the map data includes data units respectively corresponding to a plurality of display elements for display on a map, and the data units are given respective priority levels; the map database site is provided with a transmitting device (SV) for transmitting the data units via the communication network (IN) according to the respective priority levels; each of the navigation terminals (T) is provided with a receiving device (15) for sequentially receiving the data units transmitted from the transmitting device (SV); and a displaying device (13) for sequentially displaying the display elements respectively corresponding to the data units received by the receiving means (15), on the map.

According to this communication navigation system, display elements are sequentially displayed in order of higher priority levels on the displaying device of each navigation terminal. This permits the user to set more important display elements at higher priority levels, thereby presenting the user with the required information quickly. Therefore, when maps each covering a different area must be displayed while moved to switch from one area to another, for example, a useful display can be implemented without compromising the switching speed.

Another aspect of the invention provides a communication navigation method for performing navigation, using map data stored in a map database site and current position data about navigation terminals (T), by transmitting the map data to the navigation terminals (T) via a communication network (IN), wherein the map data includes data units respectively corresponding to a plurality of display elements for display on a map, and the data units are given respective priority levels; and the communication navigation method is provided with: a transmitting process for transmitting the data units via the communication network (IN) according to the respective priority levels, from the map database site; a receiving process for sequentially receiving the data units transmitted by the transmitting process; and a displaying process for sequentially displaying the display elements respectively corresponding to the data units received by the receiving process, on the map, the receiving and displaying processes being performed by each of the navigation terminals (T).

According to this communication navigation method, display elements are sequentially displayed in order of higher priority levels on the displaying device of each navigation terminal. This permits the user to set more important display elements at higher priority levels, thereby presenting the user with the required information quickly. Therefore, when maps each covering a different area must be displayed while moved to switch from one area to another, for example, a useful display can be implemented without compromising the switching speed.

Still another aspect of the invention provides a map data transmitting device (SV) that performs a communication navigation method for performing navigation, using map data stored in a map database site and current position data about navigation terminals (T), by transmitting the map data to the navigation terminals (T) via a communication network (IN), wherein the map data includes data units respectively corresponding to a plurality of display elements for display on a map, and the data units are given respective priority levels; the map data transmitting device (SV) is provided with: a transmitting device for transmitting the data units via the communication network (IN) according to the respective priority levels, to each of the navigation terminals (T) which is provided with: a receiving device for sequentially receiving the data units transmitted by the transmitting device; and a displaying device for sequentially displaying the display elements respectively corresponding to the data units received by the receiving device, on the map.

According to this map data transmitting device, display elements are sequentially displayed in order of higher priority levels on the displaying device of each navigation terminal. This permits the user to set more important display elements at higher priority levels, thereby presenting the user with the required information quickly. Therefore, when maps each covering a different area must be displayed while moved to switch from one area to another, for example, a useful display can be implemented without compromising the switching speed.

Yet another aspect of the invention provides a terminal unit that performs a communication navigation method for performing navigation, using map data stored in a map database site and current position data about navigation terminals (T), by transmitting the map data to the navigation terminals (T) via a communication network (IN), wherein the map data includes data units respectively corresponding to a plurality of display elements for display on a map, and the data units are given respective priority levels; the terminal unit is provided with: a receiving device for sequentially receiving the data units transmitted by a transmitting device in the map database site for transmitting the data units via the communication network (IN) according to the respective priority levels; and a displaying device for sequentially displaying the display elements respectively corresponding to the data units received by the receiving device, on the map.

According to this terminal unit, display elements are sequentially displayed in order of higher priority levels on the displaying device of each navigation terminal. This permits the user to set more important display elements at higher priority levels, thereby presenting the user with the required information quickly. Therefore, when maps each covering a different area must be displayed while moved to switch from one area to another, for example, a useful display can be implemented without compromising the switching speed.

Although reference symbols are added to the above description in parentheses in order to facilitate the understanding of the invention, this should not be construed to limit the invention to the modes shown in the accompanying drawings.

BRIEF DESCRIPTION OF THE DRAWINGS

FIG. 6 is a diagram showing priority levels for transmission of data units;

DETAILED DESCRIPTION OF THE PREFERRED EMBODIMENT

A preferred embodiment of the present invention will now be described with reference to the drawings. In the following description, the preferred embodiment refers to a case where the invention is applied to a navigation system which includes terminal units mounted on vehicles, a server connected to the terminal units via a network such as the Internet, and the network, and which assists in driving the vehicles.

(General Configuration and Operation)

Referring to FIGS. 1 to 4, the general configuration and operation of the navigation system according to this embodiment will be described.

Figure 1A:
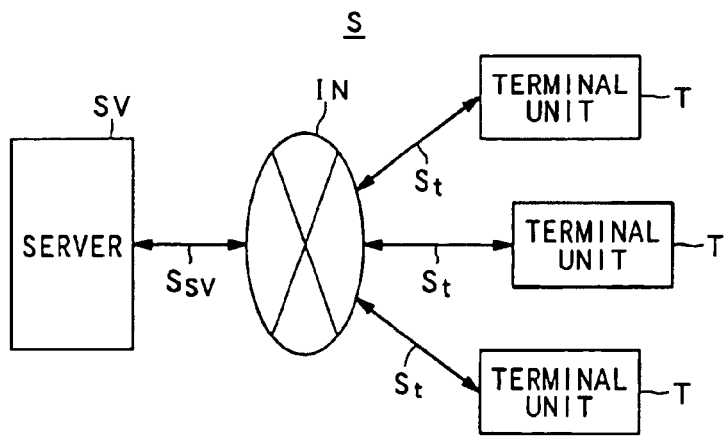
FIG. 1A is a block diagram showing the general configuration of a navigation system according to an embodiment of the invention.

As shown in FIG. 1A, the navigation system S according to this embodiment is provided with terminal units T, and a server SV. Each terminal unit T sends to the server SV a terminal signal St indicative of information such as vehicle's current position and travelling direction, as well as a request for information to be presented to a driver, and also receives from the server SV a terminal signal St indicative of various navigation process information corresponding to the request, and presents the requested information to the driver. Upon receipt of the terminal signal St as a server signal Ssv, the server SV searches for map information, etc. to be presented to the driver on the terminal unit T and performs processes (described below) including a route guidance process for his or her vehicle on which the terminal unit T is mounted, based on the received server signal Ssv, and then sends the processed results as a server signal Ssv to the terminal unit T. The terminal unit T and the server SV communicate with each other via the Internet IN.

As shown in FIG. 1A, only one sever SV is connected to a plurality of terminal units T so that the server SV can send to the terminal units T map and other information on a time division basis.

Figure 1B:
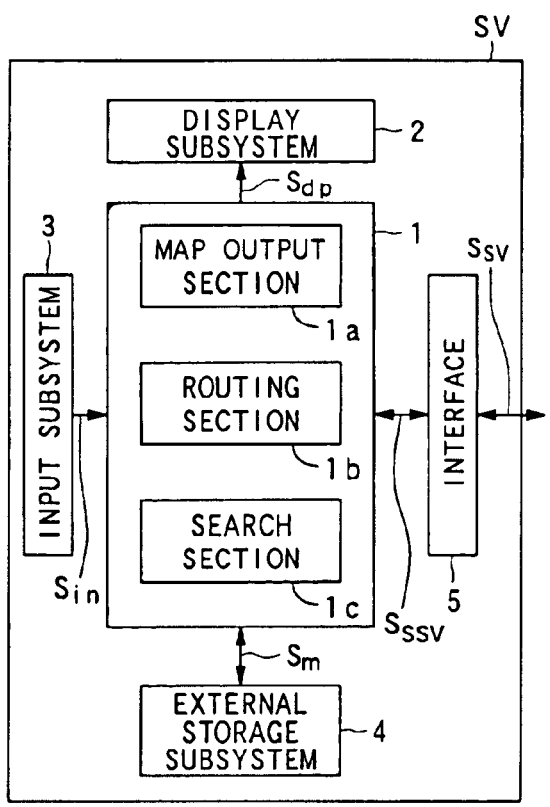
FIG. 1B is a block diagram showing a detailed configuration of a server according to the embodiment.
Figure 1C:
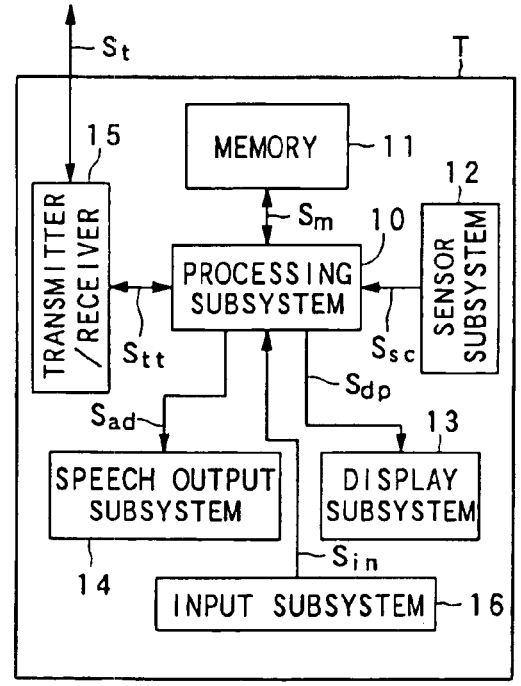
FIG. 1C is a block diagram showing a detailed configuration of a terminal unit according to the embodiment.

Referring next to FIGS. 1B and 1C, the detailed configuration of the navigation system S will be described.

As shown in FIG. 1B, the server SV comprises a CPU 1, a display subsystem 2, an input subsystem 3, an external storage subsystem 4 such as a hard drive, and an interface 5.

In the above configuration, the interface 5 appropriately interfaces an input server signal Ssv from the Internet IN to output the signal Ssv to the CPU 1 as a to-be-processed server signal Sssv, and also appropriately interfaces a processed server signal Sssv from the CPU 1 to output the signal Sssv to a terminal unit T as a server signal Ssv via the Internet IN.

The external storage subsystem 4 stores all information requisite for a navigation process performed by the navigation system S according to this embodiment, and outputs such information to the CPU 1 as a memory signal Sm, as needed. The information includes map information for display on each terminal unit T, various information used for a routing process (described below), point information for performing the navigation process according to this embodiment (more specifically, position information about points indicated on a map for display on the terminal unit T and descriptions of these points), and information about a user of the terminal unit T.

The CPU 1 is provided with a map output section 1a, a routing section 1b, and a search section 1c for its processing.

The map output section 1a searches for and reads, based on the request input as the to-be-processed server signal Sssv, map information corresponding to the request from among the map information stored in the external storage subsystem 4 as a memory signal Sm, and outputs the memory signal Sm to the terminal unit T via the interface 5 and the Internet IN as a processed server signal Sssv.

The routing section 1b calculates and finds, based on the request input as the to-be-processed server signal Sssv, a route along which the vehicle should travel, using the map information stored in the external storage subsystem 4, searches and reads the map information including the calculated and found route as a memory signal Sm, and outputs the memory signal Sm to the terminal unit T via the interface 5 and the Internet IN as a processed server signal Sssv.

Concurrently therewith, the routing section 1b generates route guidance information for guiding the vehicle having the terminal unit T aboard to move along the searched route, and outputs the searched result to the terminal unit T via the interface 5 and the Internet IN as a processed server signal Sssv.

The search section 1c searches for and reads, as a memory signal Sm, the point information, etc. stored in the external storage subsystem 4 based on the request input as the to-be-processed server signal Sssv, and outputs the memory signal Sm to the terminal unit T via the interface 5 and the Internet IN as a processed server signal Sssv.

The input subsystem 3 generates, upon entry of information necessary for the above operations, an input signal Sin corresponding to the entered information, and outputs the generated input signal Sin to the CPU 1. After having received the signal Sin, the CPU 1 performs its processing accordingly.

Information to be presented to an operator of the server SV during the above operations is output to the display subsystem 2 as a display signal Sdp so that information corresponding to the display signal Sdp is displayed on the display subsystem 2.

Then, as shown in FIG. 1C, a terminal unit T is provided with a processing subsystem 10 including a CPU and a memory, a memory 11, a sensor subsystem 12, a display subsystem 13, a speech output subsystem 14, a transmitter/receiver 15 such as a cellular telephone, and an input subsystem 16.

In this configuration, the transmitter/receiver 15 appropriately interfaces an input terminal signal St from the Internet IN to output a to-be-processed terminal signal Stt to the processing subsystem 10, and similarly interfaces a processed terminal signal Stt from the processing subsystem 10 to output a terminal signal St to the server SV via the Internet IN.

The sensor subsystem 12 is provided with a GPS receiver, a vehicle-speed sensor, and an acceleration sensor, and outputs information indicative of the vehicle's current position and attitude, etc. from the receiver and sensors, to the processing subsystem 10 as a sensor signal Ssc. The GPS receiver outputs absolute position information (absolute geographical latitude and longitude data) about a vehicle carrying the terminal unit T aboard, based on position information contained in GPS radio waves from a GPS satellite in orbit. The vehicle-speed sensor outputs distance and speed information by computing a distance traveled and a vehicle's speed based on so-called vehicle-speed pulses from a front wheel of the vehicle. The acceleration sensor detects turning angles and vertical inclinations of the vehicle to output information about the vehicle's travelling direction.

The input subsystem 16 generates, upon specification of a map for display on the display subsystem 13 or upon specification of a setting for the navigation process according to this embodiment such as a destination, an input signal Sin corresponding to the specification, and outputs the generated input signal Sin to the processing subsystem 10.

Based on these signals Ssc and Sin, the processing subsystem 10 generates information including current position information about the vehicle carrying the terminal unit T aboard, as well as a request, etc. corresponding to the specification made at the input subsystem 16. Then, the processing subsystem 10 outputs such generated information, request, etc. as a to-be-processed terminal signal Stt to the server SV via the transmitter/receiver 15.

Upon receipt of a processed terminal signal Stt via the Internet IN and the transmitter/receiver 15 from the server SV that has processed the to-be-processed signal Stt based on the current position information, request, etc., the processing subsystem 10 outputs the map information contained in the received processed terminal signal Stt to the display subsystem 13 as a display signal Sdp to display the map information thereon. The display subsystem 13 additionally displays information such as map information along the route generated by the routing section 1b within the server SV or routing information based on the route guidance information.

Of the route guidance information, audible messages to be given to the driver of the vehicle is output to the speech output subsystem 14 as an audio signal Sad, to implement the route guidance.

The processing subsystem 10 temporarily stores some information, such as the map information sent from the server SV, in the memory 11 as a memory signal Sm, which is then read, as needed, for proper indicator light processing.

(Navigation Process)

Figure 2:
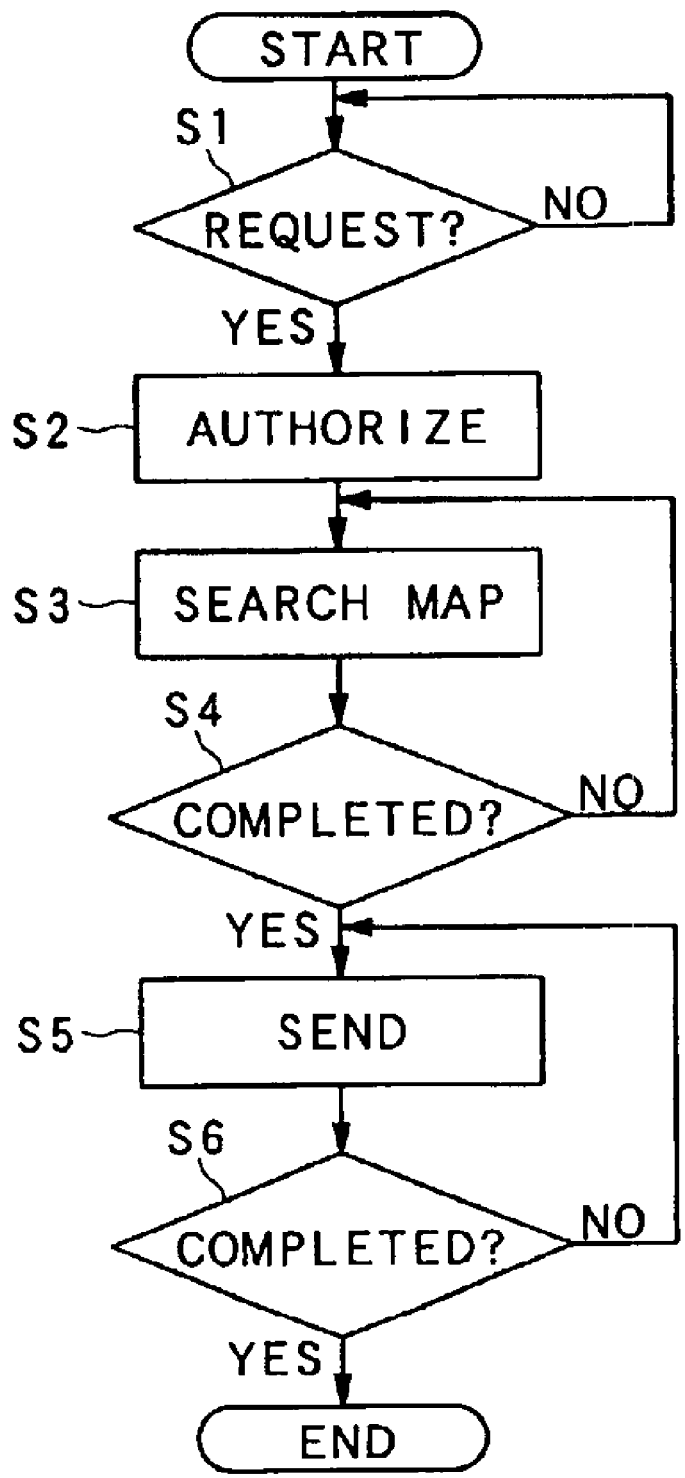
FIG. 2 is a flowchart showing a map search process according to the embodiment.
Figure 3A:
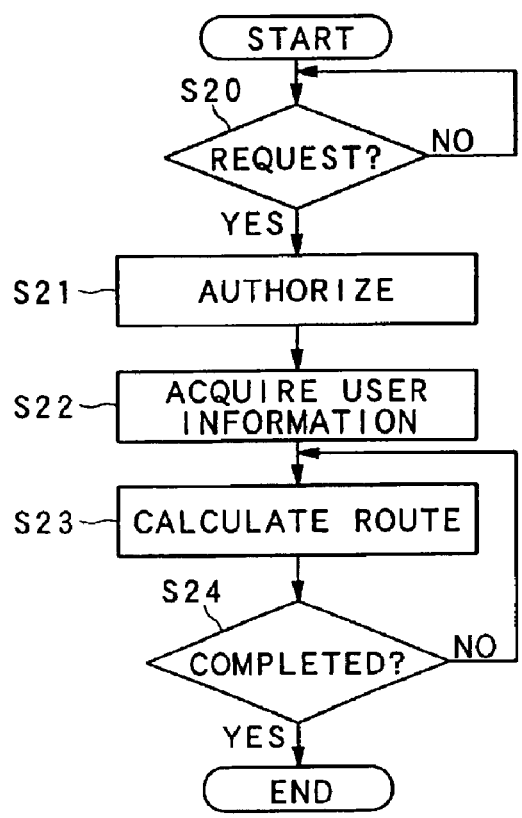
FIG. 3A is a flowchart showing a route calculation process according to the embodiment.
Figure 3B:
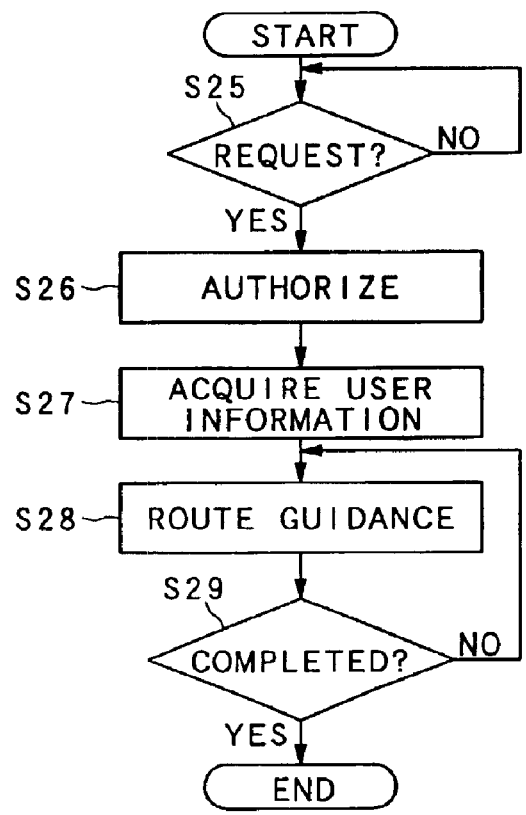
FIG. 3B is a flowchart showing a route guidance process according to the embodiment.
Figure 4:
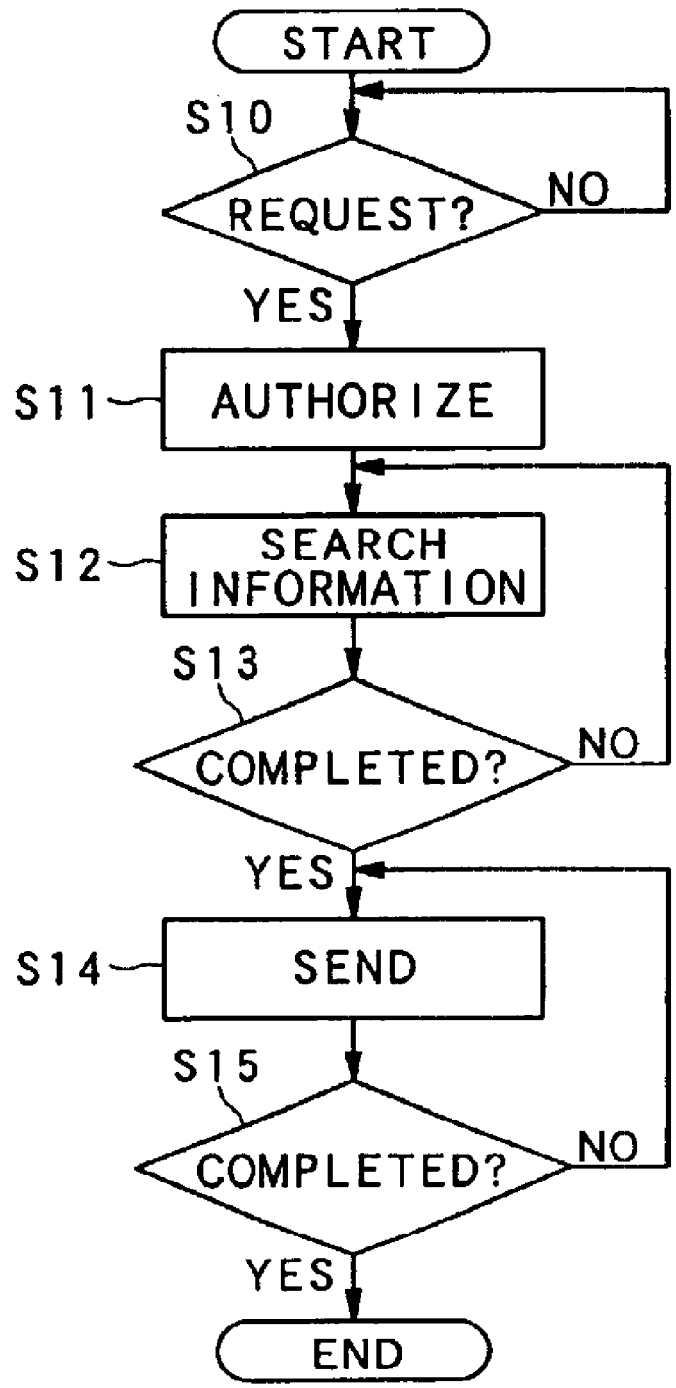
FIG. 4 is a flowchart showing an information search process according to the embodiment.

The navigation process to be performed by the navigation system S having the above configuration will be described. Referring to FIGS. 2 to 4, the description starts with steps taken by the server SV.

Referring to the flowchart shown in FIG. 2, a map search process will be described, in which steps are taken to search a map for display on the display subsystem 13 of any of the terminal units T.

In the map search process, the server SV constantly checks whether or not any terminal unit T sends a request for a map for display (step S1). If not (step S1; NO), the server SV waits. If so (step S1; YES), the server SV determines whether or not the requesting terminal unit T is authorized by the navigation system S according to this embodiment (step S2).

Upon completion of the authorization step, the server SV causes the map output section 1a to search for appropriate map information based on the received request by referring to the map information stored in the external storage subsystem 4 (steps S3 and S4). When the search step S4 is completed (step S4; YES), the searched map information is sent to the terminal unit T (step S5).

The server SV keeps checking whether or not all of the map information has been sent (step S6). If not (step S6; NO), the server SV continues sending the rest of the information, and if so (step S6; YES), it brings the series of map search steps to an end.

In the navigation system S according to this embodiment, the map information includes data units respectively corresponding to a plurality of display elements for display on a map, and each data unit is given a priority level for transmission. FIG. 6 shows the priority levels of the respective data units. The server SV sends the map information according to these priority levels in steps S3 to S6.

As shown in FIG. 6, the server SV sends the data units according to the priority levels for transmission set differently for maps on a relatively smaller scale (maps on an intermediate scale) and maps on a larger scale (city maps). For maps on an intermediate scale, the priority levels are given to display elements in such an order as: (1) seas/oceans/rivers; (2) highways/national roads; (3) Bullet Train Lines (Shinkansen); (4) principal/local roads; (5) parks/green zones; (6) factories/facilities; (7) administrative boundaries; (8) alleys; and (9) notes. For city maps, the priority levels are given to display elements in such an order as: (1) seas/oceans/rivers; (2) roads; (3) blocks; (4) administrative boundaries; (5) large buildings; (6) houses; and (7) notes. As will be described below, in the navigation system S according to this embodiment, the display elements respectively corresponding to the data units received in order of the above priority levels are displayed one after another on the display subsystem 13 of any of the terminal units T.

Referring next to the flowchart shown in FIG. 3A, a route calculation process will be described, in which steps are taken to calculate a route along which to guide a vehicle carrying any of the terminal units T thereon.

In the route calculation process, the server SV always checks whether or not a request containing a place of departure, a destination, and routing conditions (more specifically, whether or not highways are preferred, or calculations are to be made so that the vehicle drives along specific roads, etc.) has been sent from any terminal unit T (step S20). If not (step S20; NO), the server SV waits, and if so (step S20; YES), the server SV then determines whether or not that requesting terminal unit T is authorized by the navigation system S according to this embodiment (step S21).

Upon completion of the authorization step, the server SV extracts and acquires user information related to a user who owns the authorized terminal unit T from the external storage subsystem 4 (step S22), and then causes its routing section 1b to perform prescribed route calculation steps based on the destination, etc. contained in the request as well as the acquired user information (steps S23 and S24). When these route calculating steps are completed (step S24; YES), the server SV temporarily loads the calculated route information into the memory within the CPU 1, to terminate the route calculation process. The server SV may send the calculated route information to the terminal unit T so that the unit T causes its display subsystem 13 to display the received route information thereon.

Referring then to the flowchart shown in FIG. 3B, a route guidance process will be described, in which steps are taken to guide a vehicle along the calculated route, the vehicle carrying any of the terminal units T aboard.

In the route guidance process, the server SV constantly checks whether or not the terminal unit T has sent a request for starting route guidance (step S25). If not (step S25; NO), the server SV waits, and if so (step S25; YES), it determines whether or not the requesting terminal unit T is authorized by the navigation system S according to this embodiment (step S26).

Upon completion of the authorization step, the server SV extracts and acquires user information related to a user who owns the authorized terminal unit T from the external storage subsystem 4 for confirmation (step S27), and causes its routing section 1b to perform prescribed route guidance steps (steps S28 and S29) according to the request. Upon completion of the route guidance process (step S29; YES), the server SV terminates the route guidance process, which includes a step of acquiring current position information indicative of the vehicle's current position, a step of determining whether or not the acquired current position is on the previously calculated route, and a step of calculating the relationship between the vehicle's current position and a point of interest (an intersection for turn, a landmark, or the like) along the route, and sending the calculated relationship to the terminal unit T to inform the driver of the calculated relationship.

Referring next to the flowchart shown in FIG. 4, an information search process will be described, in which steps are taken to search information which is to be given to the driver of any of the terminal units T and which is related to the navigation process.

In the information search process, the server SV keeps checking whether or not any terminal unit T has sent a request for information to be given to the driver (step S10). If not (step S10; NO), the server SV waits. If so (step S10; YES), the server SV determines whether or not that requesting terminal unit T is authorized by the navigation system S according to this embodiment (step S11).

Upon completion of the authorization step, the server SV then causes its search section 1c to search for appropriate information from among the information stored in the external storage subsystem 4 based on the received request (steps S12 and S13). When the search is completed in step S13, the server SV sends the searched information to the terminal unit T (step S14).

In the meantime, the server keeps checking whether or not all of the searched information has been sent (step S15). If not (step S15; NO), the server SV continues sending the rest of the information, and if so (step S15; YES), it brings the series of information search steps to an end.

Figure 5:
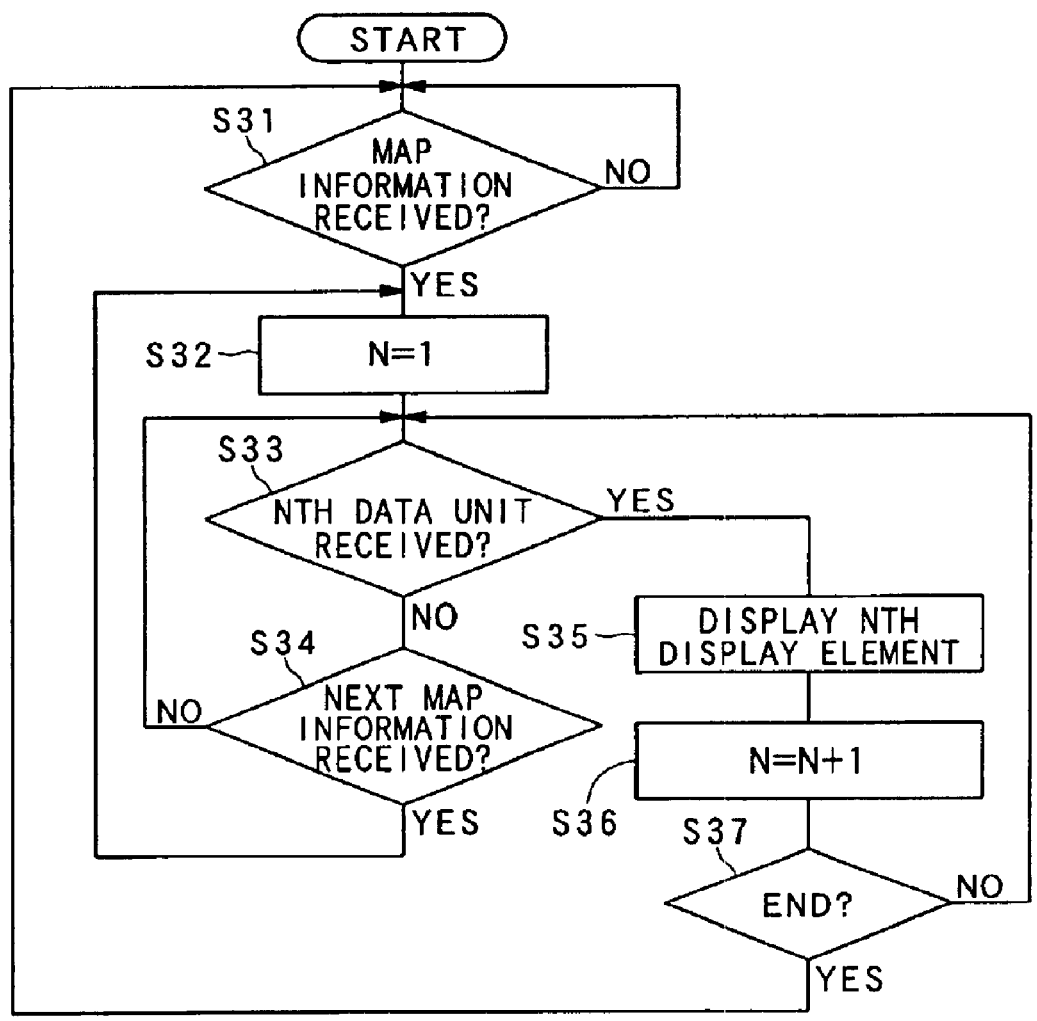
FIG. 5 is a flowchart showing a map display process.

Referring next to FIGS. 5 and 6, a map display process of the navigation process performed by any of the terminal units T will be described. The map display process shown in the flowchart of FIG. 5 is performed based on control effected by the processing subsystem 10.

Upon receipt of map information sent from the server SV, the terminal unit T displays display elements respectively corresponding to the received data units, one after another, on its display subsystem 13. As shown in FIG. 5, in the map display process, control waits until the map information is received (step S31) before proceeding to step S32. Then, control sets the priority level to 1 (step S32), after which it proceeds to step S33. In the process of FIG. 5, the priority level N corresponds to that of FIG. 6. Thus, N is set to any of 1 to 9 for map information as to maps on an intermediate scale, and 1 to 7 for map information as to city maps.

In step S33, control determines whether or not the data unit corresponding to the Nth priority level is received. If not, control proceeds to step S34, and if so, it proceeds to step S35. In step S34, control determines whether or not next map information, not currently displayed map information, is received. If so, control returns to step S32. If not, control returns to step S33. Upon return to step S32, control moves to a display step for the next map information.

In step S35, control depicts on the display subsystem 13 the display element corresponding to the Nth priority level based on the corresponding data unit. The data unit is read from the memory 11. Then, after incrementing N by 1 (step S36). control determines whether or not all the display elements contained in the current map information are displayed (step S37). If so, control returns to step S31. If not, control returns to step S33.

As described above, in the map display process of FIG. 5, the display elements respectively corresponding to the data units whose receipt has been acknowledged (step S33) are sequentially displayed according to their priority levels (step S35). When all the display elements are displayed in step S37, control waits until new map information is received (step S31). When the next map information is received in step S34, the display process for the currently displayed map information is suspended, to display the next map information in order of the display elements having higher priority levels.

Figure 7:
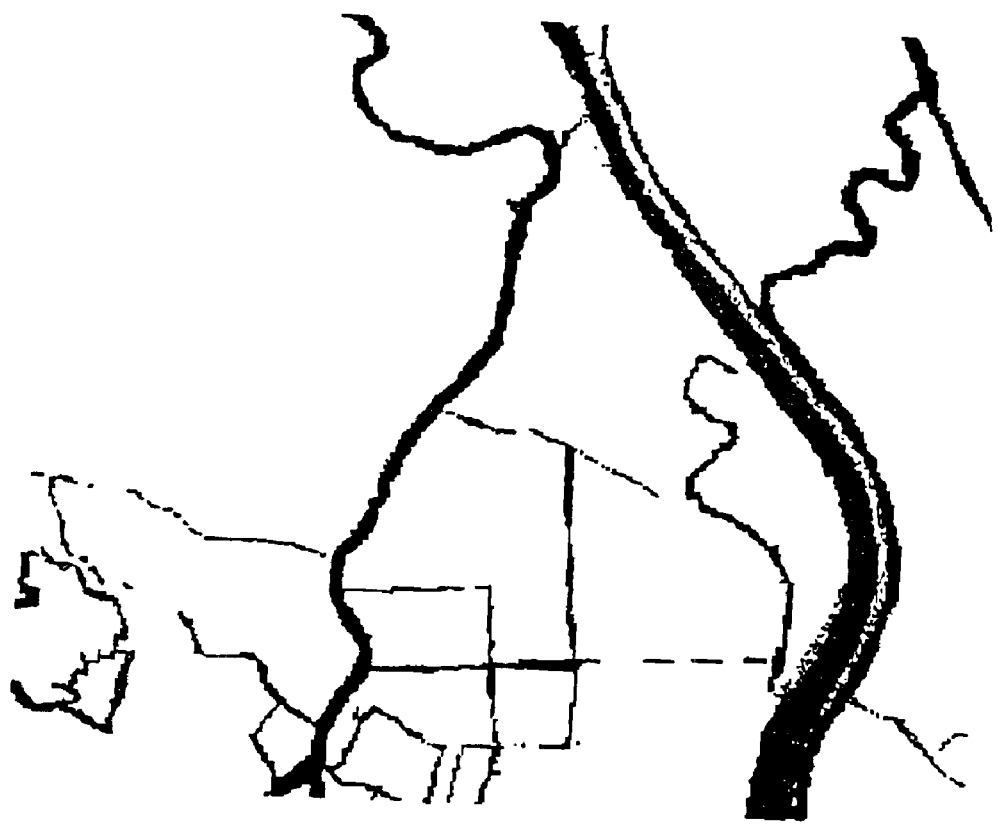
FIG. 7 is a diagram showing that only seas/oceans/rivers belonging to priority level 1 are depicted.
Figure 8:
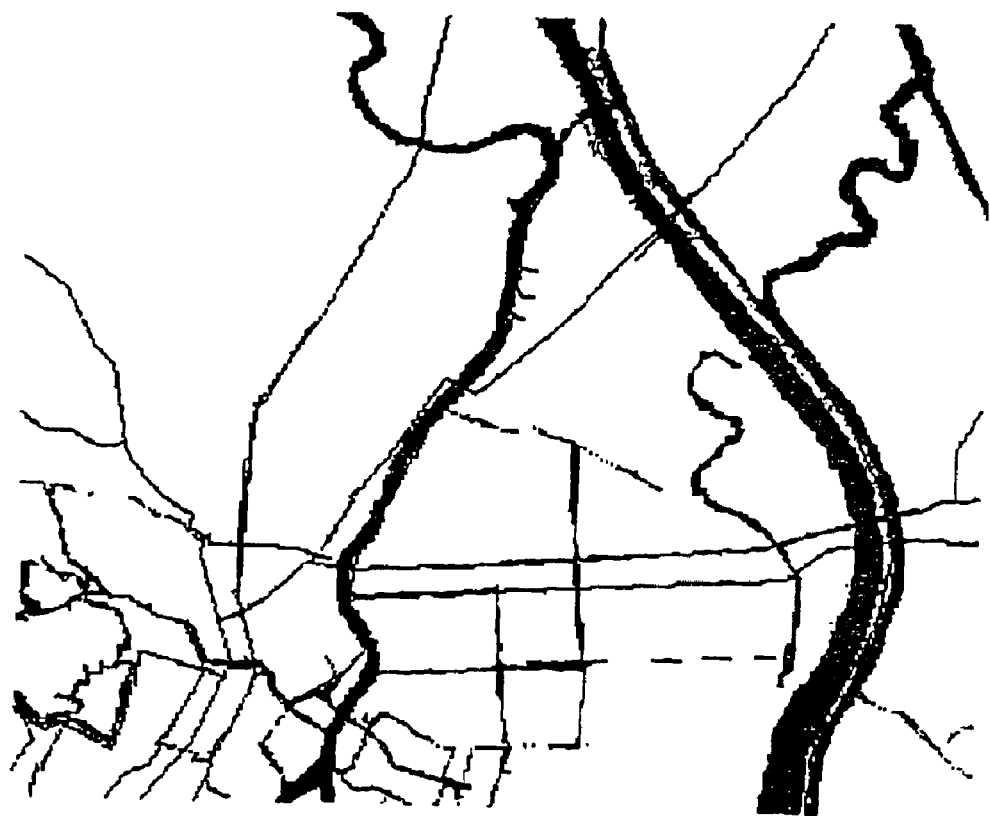
FIG. 8 is a diagram showing that highways/national roads belonging to priority level 2 are added.
Figure 9:
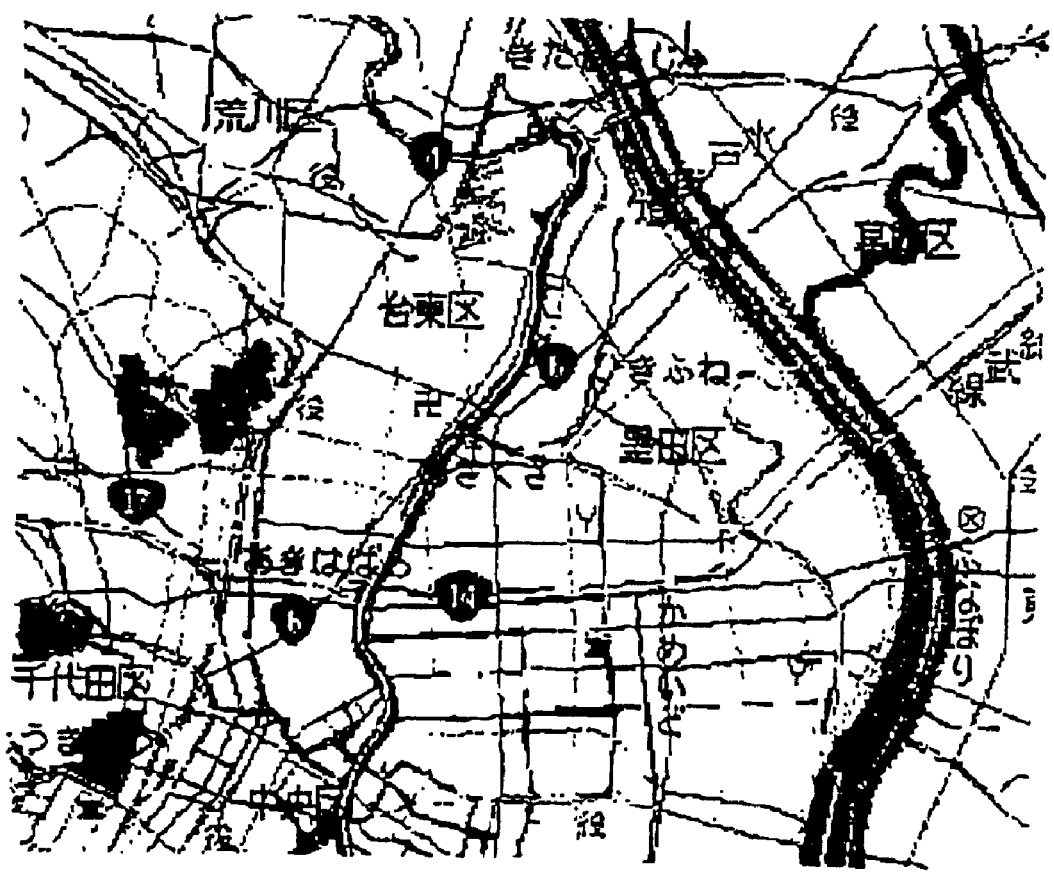
FIG. 9 is a diagram showing that all display elements are depicted.

FIGS. 7 to 9 show maps, on each of which display elements are depicted in order of priority. In FIG. 7, only seas/oceans/rivers whose priority level is 1 are depicted. In FIG. 8, only highways/national roads whose priority level is 2 are added. In FIG. 9, all the display elements are depicted.

As shown in FIG. 6, in both the map on an intermediate scale and the city map, seas/oceans/rivers are highest in priority. Once seas/oceans/rivers are depicted, a user viewing the screen of his or her terminal unit T can roughly check locations, etc. on the map, such as the current position and target points, with ease. This applies similarly to those display elements having the second and subsequent priority levels.

Thus, when maps each covering a different area are switched by scrolling or the like, for example, display elements with lower priority levels are not depicted, but only the display elements having the highest priority are depicted for the current area to allow the user to roughly check locations, etc. on the map covering the current area, before the current area is switched to the next area on the screen. Moreover, upon receipt of the next map information, the screen is immediately switched to display the new map information, quitting the depiction of the display elements corresponding to the previously received information. Thus, the user is not irritated at a slow scroll speed (map moving speed).

While the case where each display element is given a preset priority level has been described in the above embodiment, the priority levels may be changed as instructed by the user. The priority levels given to the display elements may also be set based on user information, etc. associated with each terminal unit T. In this case, the user information, etc. stored in the external storage subsystem 4 may be used to set these priority levels.

According to the communication navigation system and method, etc. of the invention, display elements are sequentially displayed in order of higher priority levels on the displaying device of each navigation terminal. This permits the user to set more important display elements at higher priority levels, thereby presenting the user with the required information quickly. Therefore, when maps each covering a different area must be displayed while moved to switch from one area to another, for example, a useful display can be implemented without compromising the switching speed.

The entire disclosure of Japanese Patent Application No. 2001-232552 filed on Jul. 31, 2001 including the specification, claims, drawings and summary is incorporated herein by reference in its entirety.

What is claimed is:

1. A communication navigation system that performs navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the communication navigation system comprising:

a transmitting device in each of the navigation terminals which transmits request information including priority levels which are determined based on the order in which map display elements are displayed by the respective navigation terminal;

a receiving device in the map database site which receives said request information from one or more of the navigation terminals;

a transmitting device in the map database site which transmits data units for all map display elements for a map to the one or more navigation terminals via the communication network, the data units being transmitted according to the respective priority levels included in received request information;

a receiving device in each of the one or more navigation terminals which sequentially receives the data units transmitted from the transmitting device; and a displaying device in each of the one or more navigation terminals which sequentially displays on the map the map display elements respectively corresponding to the data units received by the receiving devices, wherein even if all the data units for the map display elements needed for the map are not received, the displaying device displays a map based on the data units for the map display elements that are received.

2. A communication navigation method for performing navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the communication navigation method comprising:

a transmitting process in each of the navigation terminals for transmitting request information which includes priority levels which are determined based on the order in which the map display elements are displayed by the respective navigation terminal;

a receiving process in the map database site for receiving said request information from one or more of the navigation terminals;

a transmitting process in the map database site for transmitting data units for all map display elements for a map to the one or more navigation terminals via the communication network, the data units being transmitted according to the respective priority levels included in received request information;

a receiving process in each of the one or more navigation terminals for sequentially receiving the data units transmitted by the transmitting process; and a displaying process in each of the one or more navigation terminals for sequentially displaying on the map the map display elements respectively corresponding to the data units received by the receiving process, wherein even if all the data units for the map display elements needed for the map are not received, the displaying process displays a map based on the data units for the map display elements that are received.

3. A map data transmitting apparatus that performs a communication navigation method for performing navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the map data transmitting apparatus comprising:

a receiving device which receives a request information including the priority levels from one or more of the navigation terminals which are determined based on the order in which map display elements are displayed by the respective navigation terminal;

a transmitting device which transmits the data units for all map display elements for a map to the one or more navigation terminals via the communication network, the data being transmitted according to the respective priority levels included in received request information, each of the one or more navigation terminals comprising: a navigation terminal transmitting device which transmits the request information including the priority levels; a navigation terminal receiving device for sequentially receiving the data units; and a displaying device which sequentially displays on the map the map display elements respectively corresponding to the data units received by the receiving device, wherein even if all the data units for the map display elements needed for the map are not received, the displaying device displays a map based on the data units for the map display elements that are received.

4. A terminal unit that performs a communication navigation method for performing navigation, using map data stored in a map database site and current position data about the terminal unit, by transmitting the map data to the terminal unit via a communication network, wherein the map data includes data units respectively corresponding to a plurality of map display elements, and the data units are given respective priority levels, the terminal unit comprising:

a transmitting device which transmits request information including priority levels which are determined based on the order in which map display elements are displayed by the terminal unit;

a receiving device which sequentially receives data units transmitted by a transmitting device in the map database site for transmitting data units for all map display elements for a map via the communication network according to the respective priority levels; and a displaying device which sequentially displays on the map the map display elements respectively corresponding to the data units received by the receiving devices, wherein even if all the data units for the map display elements needed for the map are not received, the displaying device displays a map based on the data units for the map display elements that are received.

5. The terminal unit according to claim 4, wherein the transmitting device in the map database site transmits the data units with their respective priority levels and the receiving device determines which elements to receive based on the transmitted priority levels.

6. A communication navigation system that performs navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the communication navigation system comprising:

a transmitting device in each of the navigation terminals which transmits request information including priority levels based on map scales and the order in which the map display elements are displayed by the respective navigation terminal;

a receiving device in the map database site which receives said request information from one or more navigation terminals;

a transmitting device in the map database site which transmits data units for all map display elements for a map to the one or more navigation terminals via the communication network, the data units being transmitted according to the respective priority levels included in received request information;

a receiving device in each of the one or more navigation terminals which sequentially receives the data units transmitted from the transmitting device; and a displaying device in each of the one or more navigation terminals which sequentially displays on the map the map display elements respectively corresponding to the data units received by the receiving devices, wherein even if all the data units for the map display elements needed for the map are not received, the displaying device displays a map based on the data units for the map display elements that are received.

7. A communication navigation method for performing navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the communication navigation method comprising:

a transmitting process in each of the navigation terminals for transmitting request information which includes priority levels based on map scales and the order in which map display elements are displayed by the respective navigation terminal;

a receiving process in the map database site for receiving said request information from one or more navigation terminals;

a transmitting process in the map database site for transmitting data units for all map display elements for a map to the one or more navigation terminals via the communication network, the data units being transmitted according to the respective priority levels included in received request information;

a receiving process in each of the one or more navigation terminals for sequentially receiving the data units transmitted by the transmitting process; and a displaying process in each of the one or more navigation terminals for sequentially displaying on the map the map display elements respectively corresponding to the data units received by the receiving process, wherein even if all the data units for the map display elements needed for the map are not received, the displaying process displays a map based on the data units for the map display elements that are received.

8. A map data transmitting apparatus that performs a communication navigation method for performing navigation, using map data stored in a map database site and current position data about navigation terminals, by transmitting the map data to the navigation terminals via a communication network, wherein the map data includes data units respectively corresponding to a plurality of map display elements, and the data units are given respective priority levels, the map data transmitting apparatus comprising:

a receiving device which receives request information from one or more navigation terminals including priority levels based on map scales and the order in which map display elements are displayed by the respective navigation terminal;

a transmitting device which transmits the data units for all map display elements for a map to the one or more navigation terminals via the communication network, the data units being transmitted according to the respective priority levels included in received request information, each of the one or more navigation terminals comprising: a navigation terminal transmitting device which transmits the request information including the priority levels; a navigation terminal receiving device for sequentially receiving the data units; and a displaying device which sequentially displays on the map the map display elements respectively corresponding to the data units received by the receiving device, wherein even if all the data units for the map display elements needed for the map are not received, the displaying device displays a map based on the data units for the map display elements that are received.

9. A terminal unit that performs a communication navigation method for performing navigation, using map data stored in a map database site and current position data about the terminal unit, by transmitting the map data to the terminal unit via a communication network, wherein the map data includes data units respectively corresponding to a plurality of map display elements, and the data units are given respective priority levels, the terminal unit comprising:

a transmitting device which transmits request information including priority levels based on map scales and the order in which map display elements are displayed by the terminal unit;

a receiving device which sequentially receives data units transmitted by a transmitting device in the map database site for transmitting data units for all map display elements for a map via the communication network according to the respective priority levels; and a displaying device which sequentially displays on the map the map display elements respectively corresponding to the data units received by the receiving device, wherein even if all the data units for the map display elements needed for the map are not received, the displaying device displays a map based on the display units for the map display elements that are received.

10. The terminal unit according to claim 9, wherein the transmitting device in the map database site transmits the data units with their respective priority levels and the receiving device determines which elements to receive based on the transmitted priority levels.

11. A server for a navigation system which includes one or more terminals for displaying maps, the server comprising:

storage for storing display elements having priority levels that are based on the scales of maps on which the display elements are displayed and the order in which the display elements are to be displayed when received by the terminals;

a receiver for receiving from at least one terminal a map request for a map having a specified scale;

a processing unit for processing the received map request and retrieving display elements for the map from the storage; and a transmitter for transmitting the retrieved display elements to the at least one terminal in accordance with the priority levels of the retrieved display elements for the specified scale so that even if all the display elements needed for the complete map are not received by the at least one terminal, the at least one terminal generates a partial map by sequentially displaying the display elements that are received in accordance with their priorities.

12. The server according to claim 11, wherein the processing unit retrieves all display elements for the map from the storage and the transmitter transmits all the display elements to the at least one terminal in accordance with the priority levels of the retrieved display elements for the specified scale.

13. The server according to claim 11, wherein the display elements are transmitted along with their corresponding priority levels.

14. The server according to claim 11, wherein the priority levels are set in accordance with user information stored in the storage.

15. The server according to claim 11, wherein m priority levels are provided for display elements of a map of a first scale and n priority levels are provided for display elements of a map of a second scale different than the first scale, where m and n are different.

16. A terminal for a navigation system in which a server stores display elements having priority levels that are based on the scales of maps on which the display elements are displayed and the order in which the display elements are to be displayed when received by the terminal, the terminal comprising:

a transmitter for transmitting to the server a map request for a map having a specified scale;

a receiver for receiving display elements transmitted from the server in accordance with the priority levels of the display elements for the specified scale; and a display for displaying the received display elements in a sequence based on the priority levels, wherein even if all the display elements needed for the complete map are not received, the terminal generates a partial map by sequentially displaying the display elements that are received in accordance with their priorities.

17. The terminal according to claim 16, wherein the transmitter, the receiver and the display are embodied in an in-vehicle terminal.

18. The terminal according to claim 16, wherein the transmitter, the receiver and the display are embodied in a portable terminal.

19. The terminal according to claim 16, wherein the transmitter, the receiver and the display are embodied in a personal digital assistant.

20. The terminal according to claim 16, wherein the transmitter, the receiver and the display are embodied in a wireless telephone.

21. The terminal according to claim 16, wherein the display elements are transmitted from the server with their respective priority levels and the receiver determines which display elements to receive based on the transmitted priority levels.

* * * * *